United States Patent

Mawhinney

[11] Patent Number: 6,091,710
[45] Date of Patent: Jul. 18, 2000

[54] SYSTEM AND METHOD FOR PREVENTING DATA SLOW DOWN OVER ASYMMETRIC DATA TRANSMISSION LINKS

[75] Inventor: Ted N. Mawhinney, Clearwater, Fla.

[73] Assignee: Paradyne Corporation, Largo, Fla.

[21] Appl. No.: 08/888,769

[22] Filed: Jul. 7, 1997

[51] Int. Cl.[7] .............................. G06F 11/00; H04L 12/66; H04L 12/56

[52] U.S. Cl. ........................... 370/236; 370/352; 370/401

[58] Field of Search ...................................... 370/231, 235, 370/236, 349, 389, 394; 340/825.54; 455/68; 709/231, 232, 237

[56] References Cited

U.S. PATENT DOCUMENTS

| | | | |
|---|---|---|---|
| 4,875,208 | 10/1989 | Furuhashi et al. | 370/94.1 |
| 5,619,497 | 4/1997 | Gallagher et al. | 370/394 |
| 5,793,768 | 8/1998 | Keshav | 370/400 |
| 5,826,032 | 10/1998 | Finn et al. | 395/200.66 |

OTHER PUBLICATIONS

ISDN and Broadband ISDN with Frame Relay and ATM, Third Edition, Prentice Hall, pp. 517–524, authored by William Stallings.
Performance and Design Issues of ADSL Data Services, ADSL Forum 95–075, TIE1.4/95–095, Oct. 2, 1995, authored by S. Deng and R. Olshansky, GTE Laboratories, Inc.

Primary Examiner—Alpus H. Hsu
Assistant Examiner—Duc Ho
Attorney, Agent, or Firm—Thomas, Kayden, Horstemeyer & Risley, L.L.P.

[57] ABSTRACT

A system and method are provided for reducing data slow-down that occurs over an asymmetric communication link, particularly where the size ratio between message packets and acknowledgment packets is greater than the asymmetry ratio of the bandwidth of the communication link. Specifically, the invention resides at an intermediate system node, wherein the intermediate node is disposed to communicate across an asymmetric communication link on one side, and communicating across a high-speed symmetric bandwidth communication link on the other side. The broad aspect of the invention is that the intermediate node monitors acknowledgments being transmitted from the high-speed symmetric link, through the intermediate node, in the upstream direction of the asymmetric link. If an acknowledgment is received at a time when a prior received acknowledgment is being transmitted to the upstream node, the later received acknowledgment(s) is/are stored in a memory storage area. As excess acknowledgment packets are queued up at the intermediate node, the invention operates to drop excess packets, and transmit only the most recent, consecutive packet to the upstream node. In accordance with one aspect of the invention.

19 Claims, 8 Drawing Sheets

| 0 | 4 | 8 | 16 | 19 | 31 |
|---|---|---|---|---|---|
| Version 120 | Length 122 | Service Type 124 | Total Length 126 ||||
| Identification 128 ||| Flags 130 | Fragment Offset 132 ||
| Time to Live 134 || Protocol 135 | Header Checksum 136 |||
| Source Address 138 ||||||
| Destination Address 140 ||||||
| Options 142 ||||||
| Data 144 ||||||

FIG. 2B

| 0 | 15 | 16 | 31 |
|---|---|---|---|
| Source Port 240 ||  Destination Port 242 ||
| Sequence Number 244 ||||
| Acknowledgment Number 246 ||||
| Header Information 248 || Window Size 250 ||
| TCP Checksum 252 || Urgent Pointer 254 ||
| Options (if any) 256 ||||
| Data (if any) 258 ||||

FIG. 2C

SYSTEM AND METHOD FOR PREVENTING DATA SLOW DOWN OVER ASYMMETRIC DATA TRANSMISSION LINKS

CROSS-REFERENCE TO RELATED APPLICATIONS

This application claims the benefit of U.S. Provisional Patent Application Ser. No. 60/034,394, filed on Dec. 30, 1996, and entitled Preventing Data Slow-Down Over Asymmetric Bandwidth Links.

BACKGROUND OF INVENTION

1. Field of the Invention

The present invention generally relates to digital data communications, and more particularly to the control of digital data transmissions over asymmetric bandwidth links, such as over asymmetric digital subscriber lines (ADSL), so as to minimize the data slow-down that occurs do to the required handshaking in the upstream transmission direction.

2. Discussion of the Related Art

As is generally known, contemporary computer and communication systems are designed to be compliant with the seven layer OSI model. In this regard, communications among devices generally implicate the lower three to four layers of the OSI model. These include the physical, data link, network, and transport layers. For example, in packet switched and frame relay technologies, internode communications affect, and are controlled by, the lower three layers (physical, data link, and network). However, the higher lever transport layer may be utilized for purposes of error control.

By way of a more particular illustration, networked transmissions on the World Wide Web of the Internet are generally governed by TCP/IP (Transmission Control Protocol/Internet Protocol), which is really a family of protocols. The TCP/IP protocols affect the network layer, transport layer, and application layer, but are generally transparent to the remaining layers of the OSI model. Within the network layer, TCP/IP offers a variety of protocols, of which the Internet Protocol (IP) offers the ability to move data between hosts. The remaining protocols offer services to assist IP in its functions. The transport layer provides services that allow one application program on a particular host to communicate with another application program on a remote host. Transmission Control Protocol (TCP) is utilized at the transport layer to effect bi-directional handshaking for the transmission and control of data packets being sent between hosts. The application layer of TCP/IP generally formats data that is to be communicated to a remote host and performs other services that are necessary to accommodate this communication. In summary, the application layer creates data that is passed to the transport layer, which in turn employs transmission control. The transport layer then passes the data/messages to the network layer, which divides the messages into defined, discrete pieces, also called packets. As is known, these packets are further divided into frames at the data link layer and bits at the physical layer for transmission to remote nodes.

For purposes of this application in the present invention, the focus will be maintained on the network and transport layers of the OSI model. Looking first at the network layer, the Internet Protocol (IP) provides an unreliable, connectionless method of delivering data from one host to another. It is characterized as unreliable because the method does not guaranty delivery and, in fact, provides no particular sequencing to even assure that data packets are received in the order in which they are transmitted. It is referred to as connectionless, because no initialization sequence is necessary in order for one host to connect with another using the IP protocol. Furthermore, each data packet is independent of every other data packet.

Above the network layer is the transport layer, which handles the TCP protocol. While the packet transmission at the network layer is deemed to be unreliable, error and flow control may be implemented at the higher, transport layer. In this regard, TCP is utilized to establish reliable end-to-end transmissions. More particularly, and as is known, TCP places certain handshaking requirements on the transmission of data packets. For each data packet transmitted, an acknowledgment packet must be received. The reception of an acknowledgment informs the transmitting node (that received the acknowledgment) that the packet was successfully received at the other end. Unless an acknowledgment is "piggy-backed" onto a return data packet, the acknowledgment package is generally very short in length.

Information access services such as the Internet, have precipitated the development and expansion of services such as Asymmetric Digital Subscriber Line (ADSL) data services. As is known, ADSL services attempt to maximize the bandwidth utilization of a data link by allocating a larger bandwidth in one transmitting direction than is allocated in the opposing transmitting direction. An Internet user, for example, will generally receive much more data from an Internet service provider than will be transmitted from the user to the service provider. By providing an asymmetric bandwidth across this link, better overall bandwidth utilization is achieved. While this improves performance over that communication link, certain problems have, nevertheless, been identified. Notably, the problem of "data slow-down" which results from the upstream (smaller bandwidth) direction of acknowledgment packets, in response to each data packet received in the downstream direction.

To illustrate this problem with real-world numbers, TCP/IP generally defines the size of data packets to range between 40 and 560 bytes in links. In this way, a fully utilized data packet will generally be limited to 560 bytes. An acknowledgment packet (not piggy-backed onto a data packet) will generally comprise the smallest packet size, of approximately 40 bytes. This amounts to a traffic ratio of approximately 14:1. If a node (such as an Internet service provider) has a fairly large amount of data to transmit to a downstream node (e.g., a user), it must partition this data into a number of data packets. However, rather than being able to transmit these data packets one after another in immediate succession, the transmitting node must await the receipt of acknowledgment packets from the downstream node. If configured to receive acknowledgments in a one-to-one ratio, the transmitting node must wait to receive an acknowledgment for each data packet transmitted, before transmitting a subsequent data packet. Since this results in undue idle time, on the part of the transmitting node, most systems are generally designed to provide a "window"(e.g., window defined in TCP header) to permit the transmission of a predetermined number of data packets, without receiving an acknowledgment packet. For purposes of illustration, assume the window size is four packets. The transmitting node, then, could transmit data packets one through four before receiving an acknowledgment of the first data packet. Thereafter, the transmitting node would be limited to transmitting on a one-to-one basis. That is, for each subsequent data packet transmitted to the downstream node, it must await the receipt of an acknowledgment packet. The net result of this flow control handshaking (as implemented by TCP), is commonly referred to as data slow-down. The slowdown is manifest as intermittent periods of idle time at the transmitting node, while it awaits the receipt of acknowledgment packets, before continuing the transmission of data packets.

One solution to this problem has been to permit an end point node (downstream node) to acknowledge the receipt of multiple data packets with a single acknowledgment packet. While this has further improved the overall communication throughput over asymmetric bandwidth communication links, further improvements are desired. Specifically, it is recognized that, in the present state of the art, data slowdown can still occur at intermediate nodes of a communication path. Applicants are unaware of any prior art solutions that address this problem. Namely, where an intermediate node is disposed between end point nodes, and an asymmetric bandwidth communication link is provided on one side of the intermediate node, while a high speed symmetric link is defined on the opposite side of the downstream node.

Accordingly, there is a need to address this and other related shortcomings in the art.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method that reduces data slow-down that occurs over an asymmetric communication link, particularly where the size ratio between message packets and acknowledgment packets is greater than the asymmetry ratio of the bandwidth of the communication link. Specifically, the invention resides at an intermediate system node, wherein the intermediate node is disposed to communicate across an asymmetric communication link on one side, and communicating across a high-speed symmetric bandwidth communication link on the other side. The broad aspect of the invention is that the intermediate node monitors acknowledgments being transmitted from the high-speed symmetric link, through the intermediate node, in the upstream direction of the asymmetric link. As excess acknowledgment packets are queued up at the intermediate node, the invention operates to drop excess packets, and transmit only the most recent, consecutive packet to the upstream node.

In accordance with one aspect of the invention, a method is provided for enhancing flow control for the transmission of data packets between an upstream node and an end-point node. Preferably, the method operates at an intermediate node of a packet-based communication system wherein data is transmitted between an upstream node and an end-point node, the intermediate node having an asymmetric communication link on one side for communication with the upstream node and a high-speed symmetric link on the other side for communication with the end-point node. In such a system, the preferred method includes the steps of receiving a plurality of data packets from the upstream node and transmitting the received data packets to the end-point node. The method further includes the steps of receiving a plurality of acknowledgments from the end-point node for the data packets transmitted thereto, and transmitting a single acknowledgment packet to the upstream node, the acknowledgment packet corresponding to the last acknowledgment received from the end-point node.

In accordance with one aspect of the preferred embodiment, the method further includes the step of dropping superfluous acknowledgment packets received from the end-point node. In this regard, the method includes the step of storing an acknowledgment received from the end-point node in a memory storage area, if the intermediate node is not able to immediately propagate the acknowledgment to the upstream node. Thereafter, the method examines the memory storage area for stored acknowledgment packets and transmits the most recent, consecutive acknowledgment packet within the memory storage area.

In accordance with another aspect of the present invention, a system is provided for enhancing flow control of packet-based data transmissions between an upstream node and an end-point node, wherein all data packets pass through a common intermediate node, and an asymmetric communication link is defined between the intermediate node and the upstream node, and a high-speed symmetric communication link is defined between the intermediate node and the end-point node. In accordance with this aspect of the invention, the system includes a first receiver configured to receive data packets transmitted from the upstream node to the intermediate node, and a first transmitter configured to transmit data packets received from the upstream node to the end-point node. Also forming part of the system, a second receiver is configured to receive acknowledgment packets from the end-point node. Significantly, an acknowledgment selector is configured to select acknowledgment packets received from the end-point node, and a second transmitter is configured to transmit the selected acknowledgment packets to the upstream node.

In accordance with the preferred embodiment, the acknowledgment selector is adapted to select the acknowledgment most recently received from the end-point node. In this regard, the system further includes a memory storage area disposed to store excess acknowledgment packets received from the endpoint node. The acknowledgment selector is therefore disposed to evaluate acknowledgment packets in the memory storage area and select for transmission the most recent, consecutive acknowledgment packet. The acknowledgment selector may identify the most recent acknowledgment packet by evaluating the Acknowledgment Number field of the Transmission Control Protocol header of the acknowledgment packet.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 2B is a diagram that illustrates the structure and data of an Internet protocol (IP) header;

FIG. 2C is a diagram that illustrates the structure and data of a Transmission Control Protocol (TCP) header;

DETAILED DESCRIPTION OF THE PREFERRED EMBODIMENT

Figures 1A, 1B:
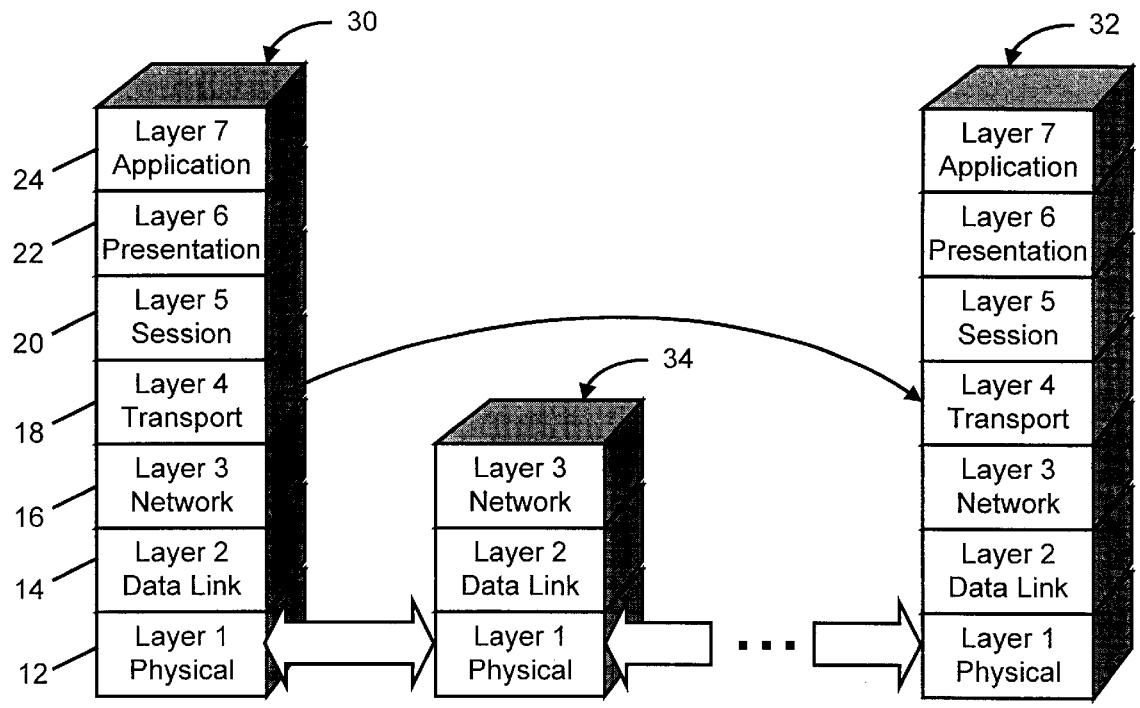
FIG. 1A is a diagram that illustrates communications between two end-points, through an intermediate node, in accordance with the seven-layer OSI model.
FIG. 1B is a diagram that illustrates various ITU-T specifications or recommendations in accordance with the OSI model.

Having summarized the invention above, reference will now be made in detail to the description of the invention as illustrated in the drawings. While the invention will be described in connection with these drawings, which relate specifically to TCP protocol as is utilized by data transmissions over the World Wide Web, there is no intent to limit the invention to the embodiment or embodiments disclosed therein. On the contrary, the intent is to cover all alternatives, modifications and equivalents included within the spirit and scope of the invention as defined by the appended claims.

Turning now to the drawings, reference is made to FIGS. 1A and 1B, which are diagrams that illustrate communications in accordance with the seven layer OSI model. As is now well known, layer one 12 is the physical layer, which is concerned with the transmission of unstructured bit streams over a physical link. The physical layer 12 involves parameters such as signal voltage swing and bit length or duration. It further deals with the mechanical, electrical, and procedural characteristics necessary to establish, maintain, and deactivate a physical link. Layer two 14 is the data link layer, which is responsible for providing the dependable communication of data across the physical link. In this regard, it transmits blocks of data with the necessary synchronization, error control, and flow control. Layer three 16 is the network layer. The network layer 16 is responsible for establishing, maintaining, and terminating connections, and it insulates the upper layers from the details or burden of data transmission. Layer four 18 is the transport layer, which serves to provide dependable transfer of data between end points. Error recovery and flow control are also provided within layer four 18. Layer five 20 is the session layer. The session layer operates to establish, maintain, and terminate connections, or sessions, between applications running at the end points and intercommunicating with one another. In this regard, it provides the control structure for communicating between the end point applications. Layer six 22 is the presentation layer, which operates to perform data transformation in order to provide a standardized application interface, and to provide common communication services. Finally, layer seven 24 is the application layer which provides services to the users of the OSI-compliant system. Network management transaction servers and file transfer protocols are examples of application layer services.

While FIGS. 1A and 1B illustrate the entire seven layer model, the present invention is concerned with communications that primarily take place at the transport layer 18. FIG. 1A illustrates the connection and communication between two end points 30 and 32 through one or more intermediate device 34. In this regard, it is appreciated that the applications executing on the end points 30 and 32 generally follow the seven layer OSI model. As is well known, intermediate devices (such as intermediate nodes within the frame relay network) need not employ all seven layers. Instead, they may employ on the physical layer 12 (such as repeaters), only the physical 12 and data link 14 layers (such as host devices), or the physical 12, data link 14, and network 16 layers (such as gateways and routers). In this regard, the first three layers are often referred to collectively as the physical layers. The transport layer of layer four 18, as previously mentioned, is responsible for end to end communications. An example of a layer four communications protocol is Transport Control Protocol (TCP). In accordance with TCP, a device 30 may specify a communication to be directed to end point device 32. Intermediate devices 34 are responsible for ensuring that the communication packet is received by device 32.

Referring to FIG. 1B, a diagram illustrates various ITU-T specifications or recommendations, in relation to the layers of the OSI model. Specifically, the I.430 basic interface and the I.431 primary interface recommendations specify physical layer transfer-transactions. ITU-T specification Q.921 (LAPD) is provided for communications at the data link layer. ITU-T specification Q.931 governs network layer transactions for ISDN D channel control signaling in circuit mode connections For packet-switched circuits, X.25 protocol standard is provided for governing D channel signaling. Frame relay control and signaling is also provided at the network layer 16.

Figure 2A:
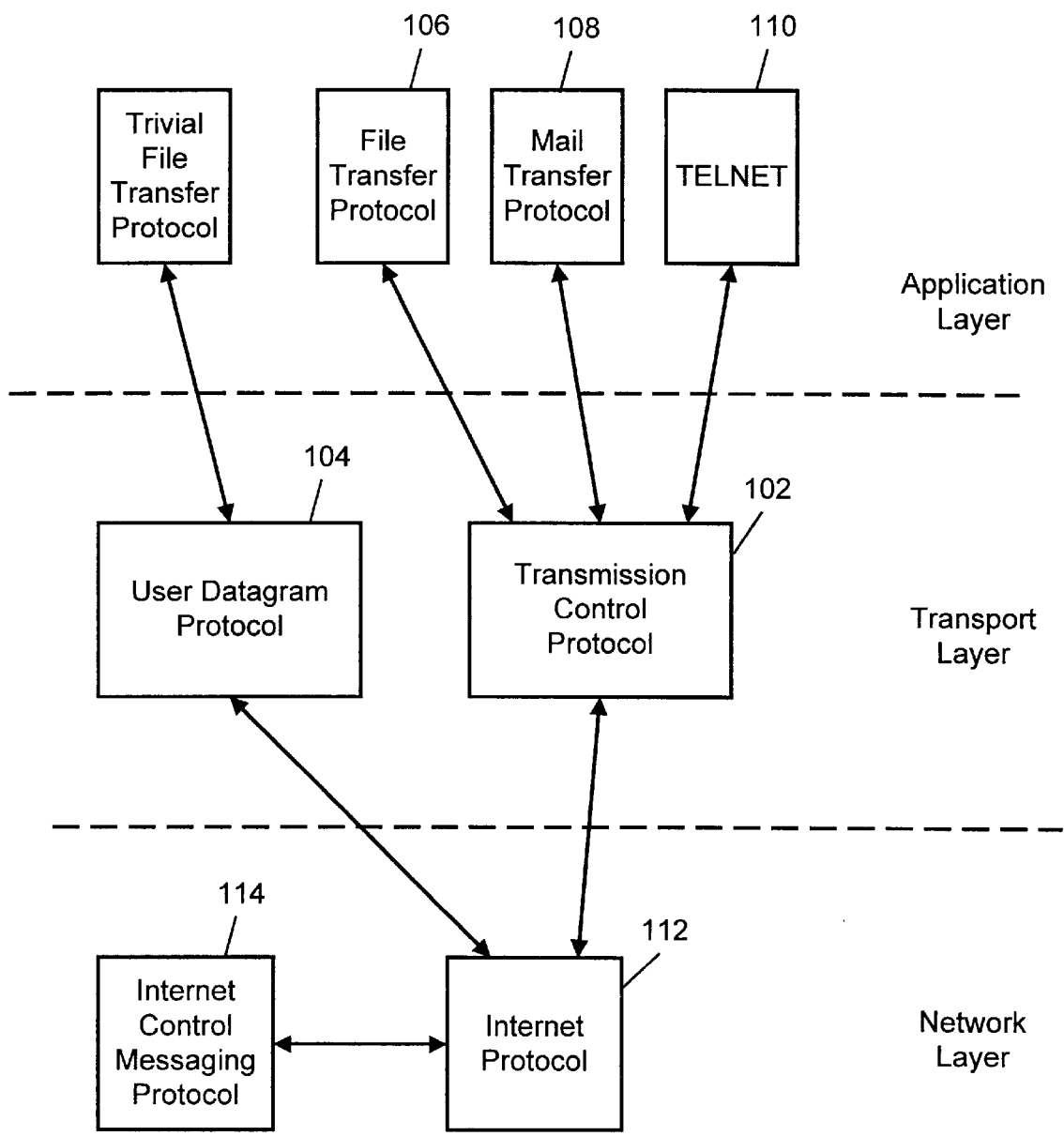
FIG. 2A is a diagram that illustrates certain features or functions that are allocated among the application layer, transport layer, and network layer of the OSI model, and that are relevant to the present invention.

Reference is now made to FIG. 2A, which is a diagram that illustrates certain features allocated among the application layer, transport layer, and network layer of the OSI model, that are relevant to the present invention. Specifically, at the transport layer blocks 102 and 104 denote the transport control protocol and user datagram protocol, respectively. Pursuant to the user datagram protocol 104, data packet transmissions are routed from a source to a destination, without employing any acknowledgment signals. Since data routing/flow control and error handling of data packets transmitted in accordance with the user datagram protocol are well known in the art, they will not be discussed herein. The preferred embodiment of the present invention utilizes TCP, as denoted by block 102. As illustrated, TCP 102 may interface with various blocks or modules at the higher OSI layers, such as File Transfer Protocol 106, Mail Transfer Protocol 108, and TELNET 110, for example. The transmission control protocol block 102 at the transport layer then interacts with the Internet protocol (block 112), at the network layer. As previously mentioned, the Internet protocol provides an unreliable connectionless method of delivering data from one host to another. It is unreliable because it does not guaranty delivery of particular messages or data packets, and provides no sequencing to even assure that the data packets are received in the order transmitted, and no acknowledgment is required by any of the participating hosts. The Internet protocol (block 112) interfaces with another functional block denoted as Internet control messaging protocol (block 114).

As is known, data packets that are transmitted in accordance with the Internet protocol include a header which contains certain information that is utilized for the data transmission. In this regard, reference is made to FIG. 2B, which is a diagram that illustrates the structure and data of an Internet protocol header. This header contains various fields, including a Version field 120, a Length field 122, a Service Type field 124, a Total Length field 126, an Identification field 128, a Flags field 130, a Fragment Offset field 132, a "Time to Live" field 134, Header Checksum field 136, a Source Address field 138, a Destination Address field 140, an Options field 142, and a Data field 144. Although they are documented and well known in the art, each of these fields will be briefly described below. More particularly, the Version field 120 identifies the format of the header used, which is typically the numerical value four. The Length field 122 specifies the length of the header only in thirty-two bit words, and the length of both the header and the data measured in octets is carried in the Total Length field 126. The Service Type field 124 indicates the quality of service desired during transmission of the particular message through the Internet system. For example, a message may be designated for high or low delay, normal or high throughput, normal or high reliability. Priority messages may be given special treatment by network facilities, if so indicated in the Service Type field 124. Typically, applications request a particular level of service upon passing a message to this layer.

The Identification field 128 identifies the particular data packet so that it can be distinguished from other data packets received by the destination host. The value assigned to the Identification field 128 is typically assigned when data is passed to the network layer from a higher layer. The Flags field 130 indicates whether the particular message is fragmented and whether this is the last message fragment. The Fragment Offset field 132 contains a value that represents the offset from the start of the original packet that the instant fragment is a part of. It is used to rebuild the full message once all fragments have been received by the destination host. This value is expressed in units of eight octets or sixty-four bits.

The Protocol field 135 specifies the next level protocol used in the data portion of the Internet datagram. For example, a value of one in the protocol field indicates that the message is an Internet control message; a value of two indicates that the message is an Internet group management message; a value of three indicates gateway-to-gateway protocol; a value of four indicates Internet protocol encapsulated within an Internet protocol, just to name a few. The "Time to Live" field 134 specifies the duration of how long the datagram or message will be stored on the network before it is destroyed. In this regarding, a time limit generally must be specified so that if there is an error on the network and some data fragment is lost, other pieces of the original message will be destroyed at some later time, and therefore will not continue to tie up system resources of the network.

The Header Checksum field 136 is used to provide error checking on the header itself. The Source Address field 138 and Destination Address field 140 are the Internet addresses (IP addresses) of the hosts of interest. The Options field 142 is used for specifying certain routing options, security options, and network testing. For example, one setting of the options field may request that the route that a particular data packet takes be recorded in the packet. Another may, for example, indicate that the routing through the network is to be specified in this packet and should be used. Finally, the data itself is contained in field 144.

Figure 3:
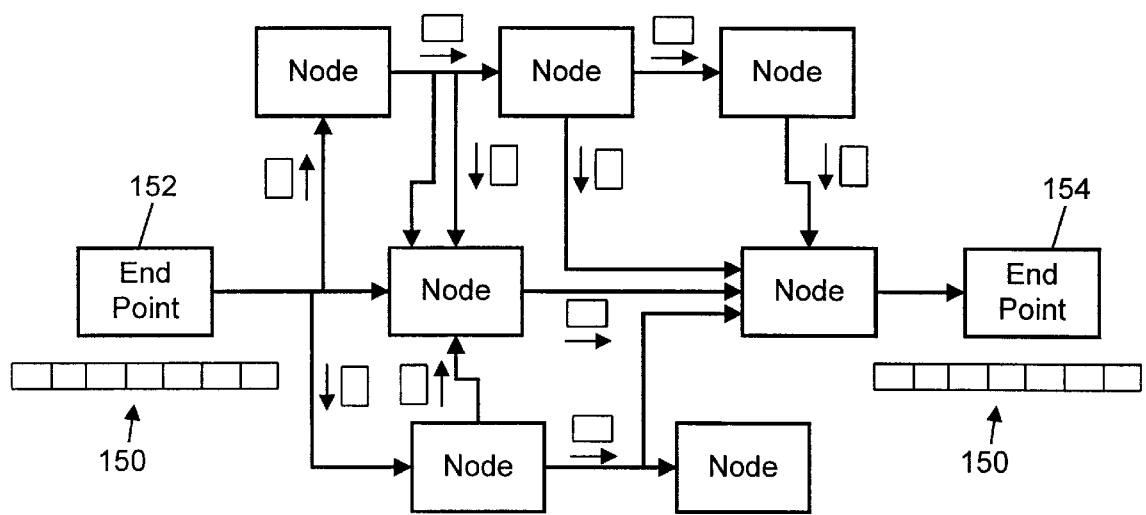
FIG. 3 is a diagram that illustrates the fragmentation and transmission of a message from a first end-point node to a second end-point node, with a plurality of intermediate nodes, defining a plurality of data/communication paths.

The fragmentation of message packets, the routing of messages from one node or end-point to another, Internet addressing, subnet addressing, and other related topics are known and understood in the art, do not directly impact the understanding of the present invention, and therefore will not be described herein. Suffice it to say, in making brief reference to FIG. 3, that a message 150 will usually comprise a plurality of smaller segments or message fragments. In transmitting such a message 150 from a first, source end-point 152 to a second, destination end-point 154, the message may be subdivided into a plurality of fragments that are directed across a plurality of intermediate nodes (such as gateways or routers). As illustrated, the various segments or message fragments may be routed over a number of different paths to reach the ultimate destination end-point 154. However, all the message packets will ultimately converge at the destination end point 154. Although the various segments or message fragments may be received out of order, by using the Fragment Offset field 132, the destination end-point 154 will reassemble the message 150 in its proper order.

In accordance with the concepts and teachings of the present invention, TCP is utilized, at the transport layer, to provide flow control utilizing message acknowledgments. Specifically, at the destination end-point node 154, the node 154 will transmit an acknowledgment back to the source node 152 upon receipt of each message fragment. As is known in the prior art, this data message transmission and acknowledgment is typically implemented using what is often referred to as a "sliding window." That is, the source end point 152 will not transmit more than a certain predetermined number of message packets without receiving an acknowledgment. This window size, although it may be dynamically reconfigurable, is generally selected from a result of design tradeoffs. A larger the window size (i.e., more messages that can be transmitted without receiving an acknowledgment), allows the source node to continue data transmissions without being held up or delayed to await the receipt of acknowledgments. However, if an error is encountered (e.g., the recognition that a certain data fragment was lost) then more data packets must be retransmitted.

As previously mentioned, the present invention is principally implemented by utilizing information and control provided in and through the TCP header, which is illustrated in FIG. 2C. The purpose and effect of the various TCP header fields are generally known and well documented. Therefore, they will only be summarily described herein, as their utilization and effect will be appreciated by persons having ordinary skill in the art. In short, the TCP header includes a Source Port field 240, a Destination Port field 242, a Sequence Number field 244, an Acknowledgment Number field 246, a Header Information field 248, a Window Size field 250, a TCP Checksum field 252, an Urgent Pointer field 254, an Options field 256, and a Data field 256.

The Source Port field 240 is a two byte field assigned on the sending computer to the application program that passed the instant message to TCP for transmission. The Destination Port field 242 is a two byte field assigned on the receiving computer to the destination application for the instant message. The Sequence Number field 244 is a four byte field that identifies the starting byte of the instant segment within the application message. If the SYN flag (discussed below) is set, this field 244 contains the initial sequence number being forced and the contents of the Data field begin with message byte "Sequence+1". The Acknowledgment Number field 246 specifies the next sequence number the sender expects to receive. This field is valid only if the ACK flag (discussed below) is set.

The Header Information field 248 is a two byte field that contains various header information, including several condition flags. Specifically, bits 0–3 define the off—sed-i.e., the length of the TCP header in 32 bit words. Bits 4–9 are reserved. Bit 10 is the URG flag. When this bit/flag is set, the contents of the Urgent Pointer field 254 are valid. Bit 11 is the ACK flag. When this bit/flag is set, the contents in the Acknowledgment Number field 246 are valid. Bit 12 is the PSH flag. When this bit/flag is set, a push function is executed, whereby the data carried in the current message is pushed through to the receiving application immediately. Bit 13 is the RST flag. When this bit/flag is set, the communication connection is reset. Bit 14 is the SYN flag. When this bit/flag is set, the system synchronizes transmission sequence numbers. Finally, bit 15 is the FIN flag. When this bit/flag is set, it indicates that the current packet is the final data packet from the sender.

The Window Size field 250 is a two byte field that specifies the number of segment bytes the sender is willing to receive subsequent to the datagram being acknowledged. The TCP Checksum field 252 is a two byte field that is used for error detection (contains 16-bit half-words, one's complement, summed). The Urgent Pointer field 254 is a two byte field whose contents specify a pointer to the last byte within the segment which is urgent and should be expedited in delivery. As mentioned above, the contents of this field are valid only when the URG flag is set. The Options field 256 is a variable length field that contains other TCP parameters, and is most commonly used in negotiating a connection. Finally the Data field 258 is a variable length field that contains any data accompanying the current datagram transmission.

Figure 4:
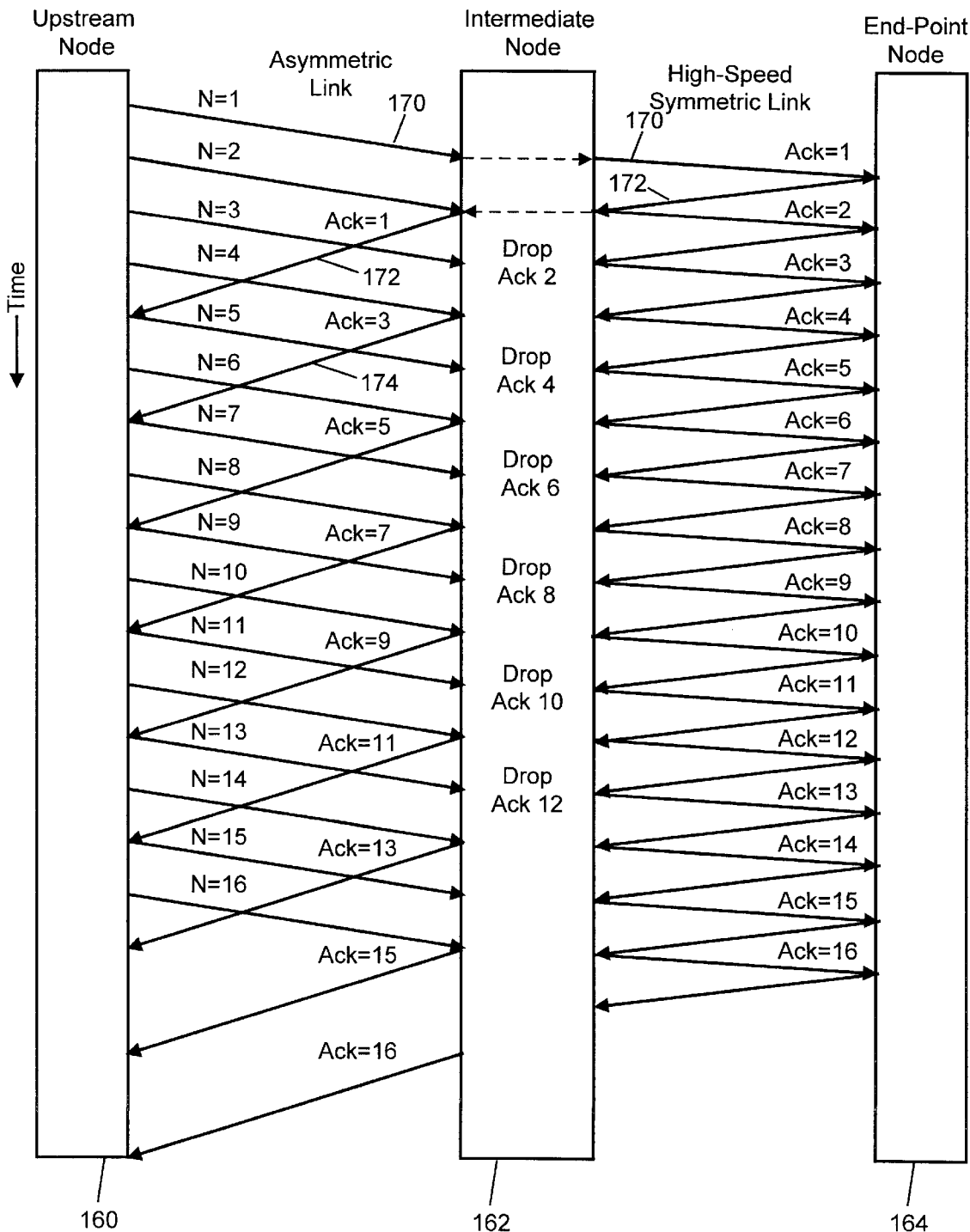
FIG. 4 is a timing diagram that depicts the timing of communications between an upstream node to a destination, end-point node, through an intermediate node, in accordance with the present invention.

Having summarized the IP and TCP headers, reference is now made to FIG. 4, which illustrates the resultant operation of a system constructed in accordance with the present invention. Specifically, three nodes are illustrated in FIG. 4: an upstream node 160, and intermediate node or a downstream node 162, and a destination end-point node 164. The present invention is preferably implemented as a software program residing at the intermediate node 162. As illustrated, an asymmetric bandwidth channel is defined between the upstream node 160 and the intermediate node 162, while a high-speed symmetric link is defined between intermediate node 162 and end-point node 164.

In accordance with the invention, a program is configured to reside at the intermediate node 162 and monitor incoming data traffic from the asymmetric link that is ultimately directed to the end of point node 164. The intermediate node will identify such data packets by recognizing or associating the destination address provided in the destination address field of the IP header (FIG. 2B) with the destination address of the end-point node 164 and TCP connection identifier (socket). Upon receiving messages directed to the end-point node 164, the intermediate node 162 will propagate those messages through to the end-point node 164, which in turn generates an acknowledgment for each message received. Since the intermediate node 162 and end-point node 164 are connected by way of a high-speed symmetric link, the end point node 164 will generate an acknowledgment for each individual data message received, and need not piggyback acknowledgments for retransmission to the intermediate node 162, because there is no delay in upstream packets. However, to avoid the data slowdown that otherwise occurs over the asymmetric link, the intermediate node 162 is configured in accordance with the invention to recognize acknowledgments received from the end-point node 164. The intermediate node 162 is capable of identifying such acknowledgments from the end point 164 by the information contained in the TCP header previously described.

By way of specific example, FIG. 4 shows 16 messages (n=1 through n=16) that are transmitted from the upstream node 160 to the end-point node 164 by way of the intermediate node 162. Likewise, sixteen acknowledgments (Ack=1 through Ack=16) are transmitted by the end-point node 164 to the upstream node 160. Tracking the first few message transmissions, a first data message 170 is transmitted from the upstream node 160 to the intermediate node 162. Upon receipt by the intermediate node 162, the data message is propagated through the intermediate node 162 (propagation represented by dash lines) and then is transmitted across the high-speed symmetric link to end point 164. Node 164 then generates an acknowledgment 172 for this first message, which is again propagated through the intermediate node 162.

In interpreting the diagram of FIG. 4, the passage of time is represented by vertical displacement from top to bottom. For this reason, each of the lines indicating either a data message or data acknowledgment are slightly downwardly sloped in the direction of the message transmission. For example, the first data message 170 originates at upstream node and is propagated to the intermediate node 162 with a slightly downward slope. In similar fashion, the acknowledgment 172 from node 164 to 162 has a slightly downward slope. However, that same acknowledgment propagated from node 162 to the upstream node 160 has a much larger downward slope. This larger downward slope reflects the narrower bandwidth of the asymmetric link. Stated another way, the data transmission and acknowledgments (both directions of the high speed symmetric link have relatively equal downward slopes). However, the data message transmissions on the asymmetric link have a much shallower downward slope in the direction from the upstream node to the intermediate node than do the acknowledgment signals from the intermediate node 162 back to the upstream node 160. For this reason, as data messages are received at the intermediate node 162, they may be immediately propagated to the end point node 164 and return acknowledgments transmitted thereupon. However, the intermediate node 162 cannot begin transmission of a subsequent acknowledgment message until the prior acknowledgment message is completed. For this reason, acknowledgment 174 cannot be transmitted until acknowledgment 172 has been completely transmitted to the upstream node 160.

Figure 5:
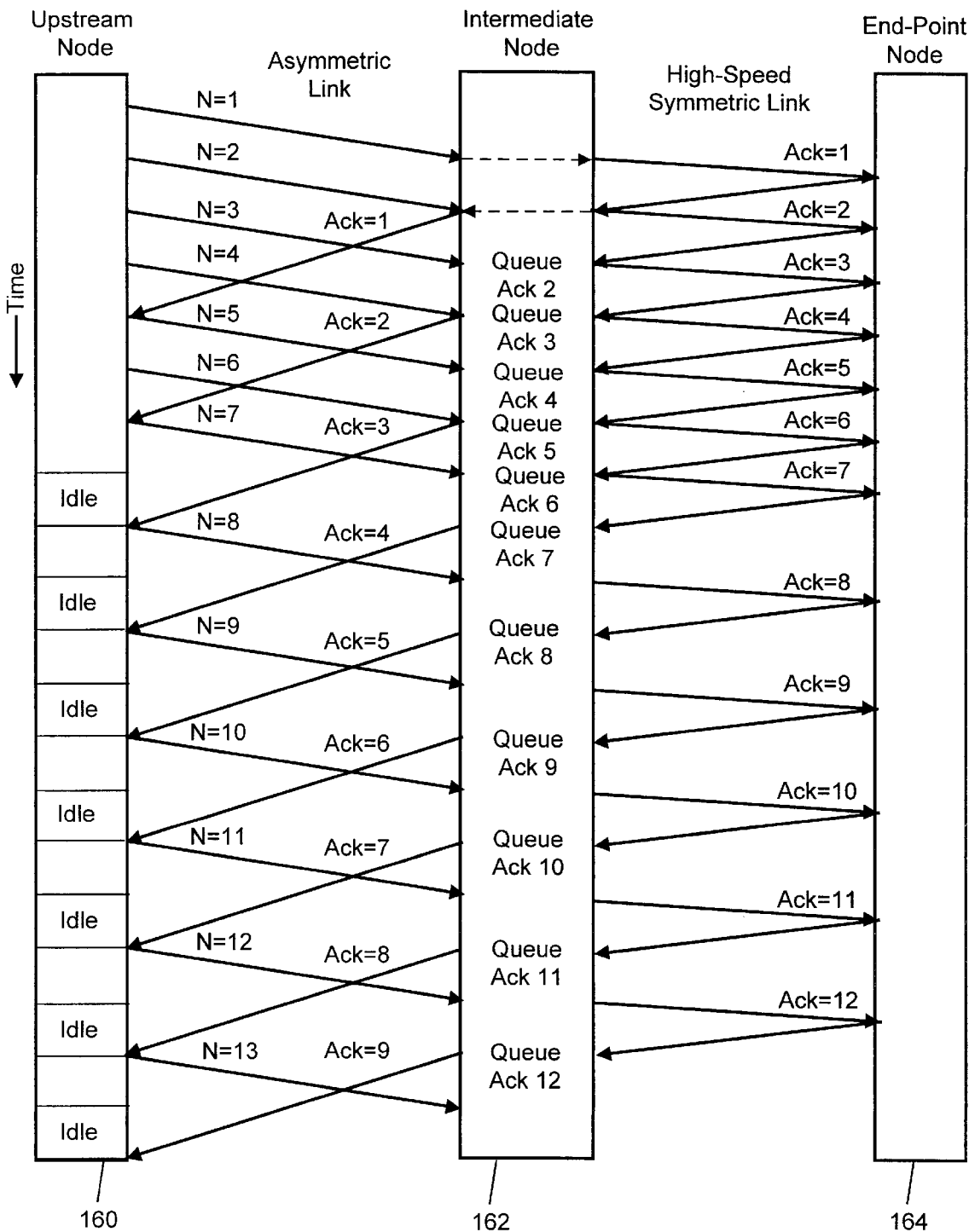
FIG. 5 is a timing diagram similar to that in FIG. 4, but illustrating the timing of communications between the nodes in accordance with prior art communications.

If, as is the present state of the prior art, the intermediate node 162 propagated a one-to-one acknowledgment transmission of acknowledgments from end point node 164 to upstream node 160, data slow-down would be encountered. That is, once the window size set by the upstream node 160 had been reached, then the upstream node would not transmit further messages until another acknowledgment is received. Reference is made briefly to FIG. 5 (denoted as Prior Art), which illustrates the effect of this data slowdown. Namely, periodic idle periods of time at the upstream node. In accordance with the timing diagram of FIG. 5, the defined window size is 5. Therefore, once five messages have been transmitted by the upstream node, without receiving acknowledgments, the upstream node waits to receive acknowledgments, and thereafter transmits messages on a one-to-one basis (message-to-acknowledgment). Thus, as illustrated, upon transmitting the seventh message (n=7), having received only two acknowledgments, the upstream node awaits receipt of the third acknowledgment. This waiting period is depicted as idle time, which thereafter occurs periodically following each message transmission. As can be seen, the overall communication throughput between the two nodes is less that that achieved by the present invention.

However, in accordance with the present invention, this slow-down effect is resolved by the concepts and teachings of the present invention. In this regard, the software residing at the intermediate node 162 recognizes when multiple acknowledgment messages from the end point 164 are queued up for transmission to the upstream node 160. It may then piggy-back multiple acknowledgment messages together for a single acknowledgment transmission (e.g., acknowledgment 174). In practice, the intermediate node will transmit, as an acknowledgment, the latest acknowledgment message, and drop all intervening messages.

Since this type of error handling is known in the prior art, FIG. 4 has assumed that all messages are received in the order that they were transmitted, for simplification and better illustration of the inventive concepts. While the broad concept of transmitting multiple acknowledgments is known in the prior art, it has never before been implemented at a node that is intermediate in the transmission channel. Instead, it has only been implemented in prior systems at an end-point node. Specifically, and end-point that is transmitting over an asymmetric communication link. However, the present invention address the problem where an intermediate node interconnects between asymmetric link and a high speed symmetric link.

Figure 6:
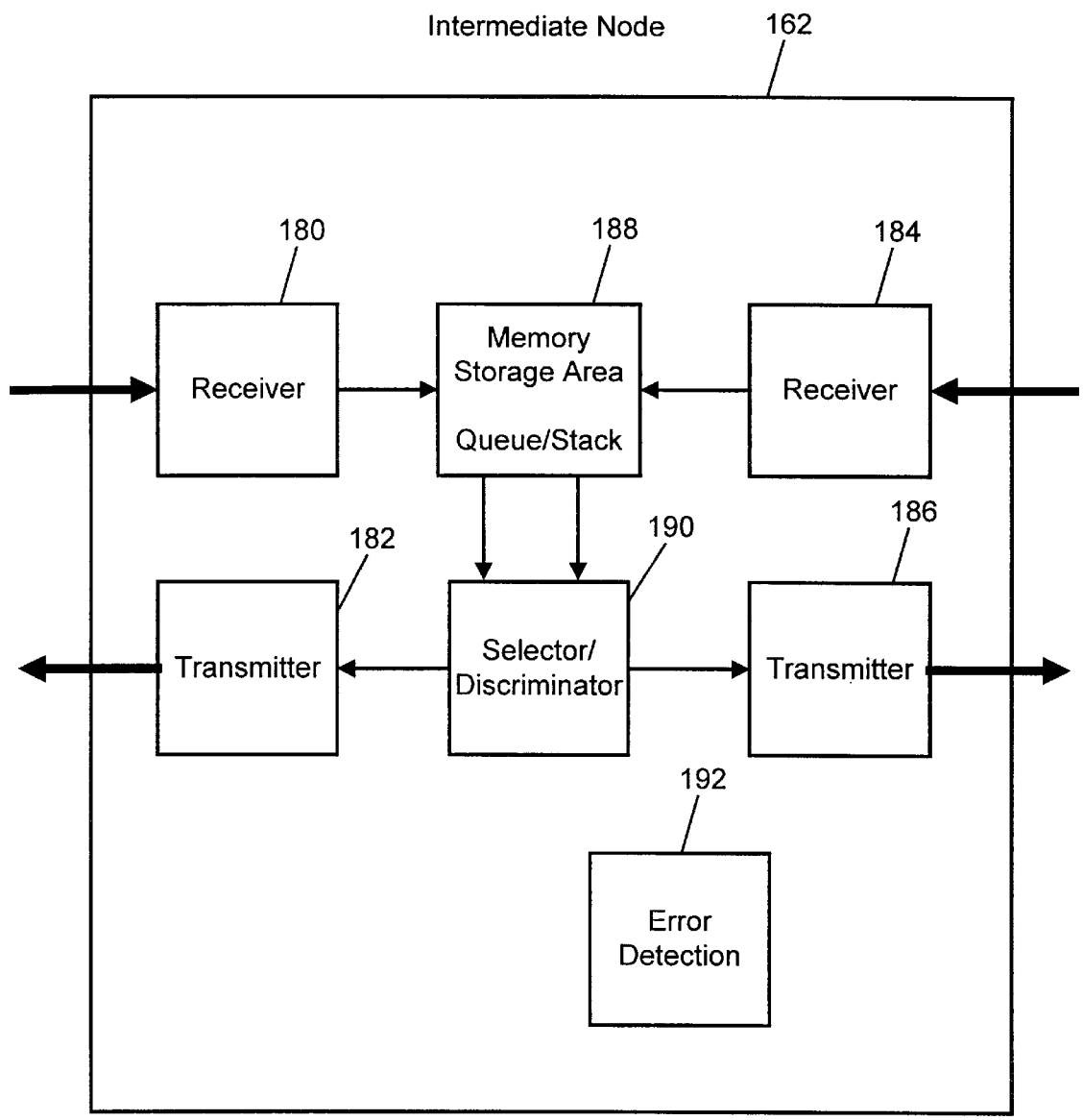
FIG. 6 is a block diagram illustrating the principal functional components of the present invention.

To better appreciate the broad functional elements of the present invention, reference is made briefly to FIG. 6. FIG. 6 is a functional diagram illustrating the principal components of the program residing at the intermediate node 162. Specifically, the node 162 includes a first receiver 180 that is configured to receive data messages transmitted across the asymmetric link. Likewise, a first transmitter 182 is configured to transmit data across the asymmetric link. In similar fashion, a second receiver 184 is disposed to receive data transmissions transmitted to the intermediate node 162 by way of the high-speed symmetric link. A second transmitter 186 is configured to transmit data from the intermediate node across the high-speed link. Significant for the presently preferred embodiment of the present invention, are memory storage area 118 and the functional block denoted as selector/discriminator 190. As various messages and acknowledgments are received by the first and second receivers 180, 184, they are placed in a temporary memory storage area. Depending on a particular implementation, the storage area could be configured as random access memory, as a queue, as a stack, etc. Furthermore, the memory storage area 188 may be segmented to provide a separate area for storing messages received by the first receiver and a separate area for storing messages/acknowledgments received by the second receiver 184. The selector/discriminator 190 is configured to read messages out of this memory storage area for transmission either from the first or second transmitters 182, 186. Consistent with the example presented in FIG. 4, the memory storage area 188 will frequently receive and store multiple acknowledgments received from the receiver 184. When the transmitter 182 is idle, such that it is capable of transmitting another acknowledgment from the intermediate node 162 to the upstream node 160, the selector/discriminator 190 may be configured to monitor the storage area 188 to see if one or more acknowledgments are awaiting transmission. That is, if the last acknowledgment transmitted from transmitter 182 was acknowledgment number three, the selector/discriminator 190 must ensure that acknowledgment number four is in the memory storage area 188. If so, it will look to see if additional, consecutive acknowledgments are awaiting transmission in the memory storage area 188. If so, it will select the highest number acknowledgment message for transmission, and delete the remaining messages from memory.

An error detection block 192 is also illustrated. It is not an integral part of the present invention, and therefore is not discussed herein. It is depicted merely for purposes for illustrating the notion that error detection and handling may be implemented at the intermediate node 162 in manners that are either known in the prior art or understood by those skilled in the art.

Figure 7:
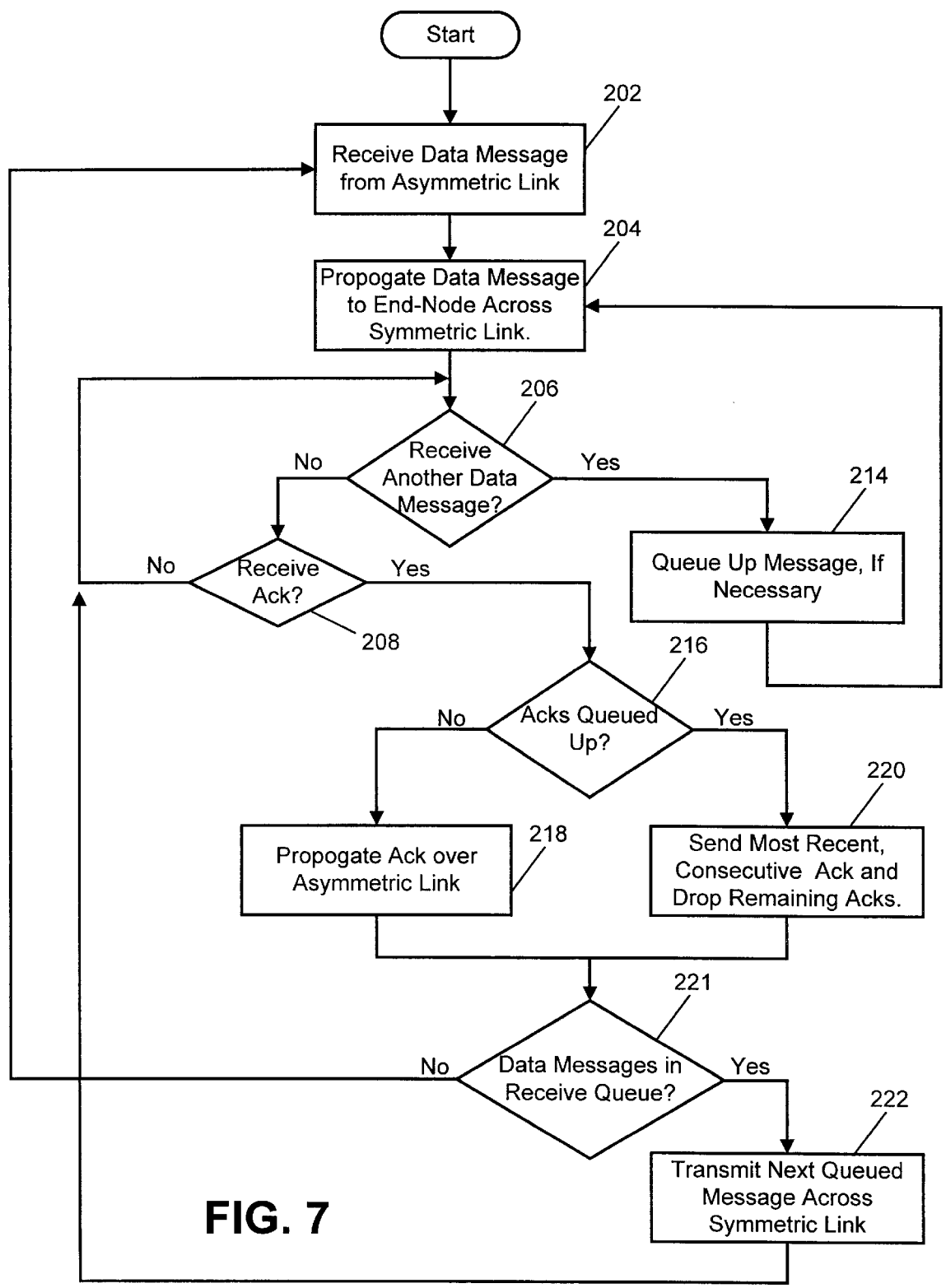
FIG. 7 is a software flowchart, illustrating the top-level operation of a preferred embodiment of the present invention.

To further illustrate the operation of the present invention, reference is now made to FIG. 7, which is a software flowchart depicting the top-level operation of a program residing at an intermediate node 162, and operating in accordance with the teachings of the present invention. At step 202, the invention will receive a data message transmitted across the asymmetric link, which is destined for the end point node 164. Upon receiving such a data message, the intermediate node will propagate the data message on to the end point node 164 across the high-speed symmetric link (step 204). At this point, one of several things may happen, depending upon the relative speeds of the asymmetric and high-speed symmetric links, data message size, and other factors. Namely, the intermediate node may receive a subsequent message before the first message has been transmitted completely to the end point node 164 for transmission to the end point node, the intermediate node may receive the acknowledgment back from the end point node 164. If, the intermediate node receives another data message (step 206 resolves to Yes), it queues that message up in a temporary storage area 188 (at step 214). Once the transmitter 186 is capable of transmitting that message across a high-speed link, the system will return to step 204 and do so. If, however, step 206 resolves to No (intermediate node 162 does not receive a subsequent data message), then at step 208 it determines whether it receives an acknowledgment. If/when the intermediate node receives an acknowledgment message, it then proceeds to step 216 wherein it determines whether other acknowledgment messages have been queued up. If not, it propagates the single acknowledgment over the asymmetric link (step 218). If, however, additional acknowledgment messages are stored or queued up in the memory storage area 188, the system will transmit the most recent, consecutive ack, as previously described, and drop the remaining acknowledgments (step 220). If there are no messages in the received queue for transmission to the end point node 164 (step 221) then the system will return to step 202 and await receipt of the next data message. If, however, there are messages in the receive queue and the transmitter 186 is capable of transmitting such messages, then the next queued message will be transmitted across the symmetric link (step 222).

It is noted that the flowchart presented in FIG. 7 is presented merely for purposes of illustrating the conceptual operation of the system. Certainly, due to a variety of design considerations and specific operations which need not be described in detail for purposes of describing the inventive concepts, the actual implementation may differ from that shown in FIG. 7. Indeed, there are a wide variety of ways to implement a system to achieve the broad concepts of the present invention. For example, the invention is characterize herein as a computer program. However, it should be appreciated that the invention is implement as a combination of hardware and software. In this regard, it may be a general purpose computing device specially configured through software, or it may be implemented as specially designed hardware.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In an intermediate node of a packet-based communication system wherein data is transmitted between an upstream node and an end-point node, the intermediate node having an asymmetric communication link on one side for communication with the upstream node and a high-speed symmetric link on the other side for communication with the end-point node, a method for enhancing flow control for the transmission of data packets between the upstream node and the end-point node comprising the steps of:

receiving a plurality of data packets from the upstream node across the asymmetric communication link;

transmitting the received data packets to the end-point node across the high-speed symmetric communication link;

receiving acknowledgment packets across the high-speed symmetric communication link from the end-point node for the data packets transmitted thereto; and transmitting a single acknowledgment packet to the upstream node across the asymmetric communication link, the single acknowledgment packet corresponding to the lasts, consecutive acknowledgment packet received from the end-point node.

2. The method as defined in claim 1, wherein the intermediate node is connected to a plurality of upstream nodes.

3. The method as defined in claim 2, wherein the step of transmitting an acknowledgment packet to the upstream node, includes transmitting an acknowledgment to any one of the plurality of upstream nodes.

4. The method as defined in claim 1, further including the step of storing the acknowledgment packets received from the end-point node in a memory storage area, if the intermediate node is not able to immediately propagate the single acknowledgment packet to the upstream node.

5. The method as defined in claim 4, wherein the step of transmitting a single acknowledgment packet to the upstream node includes the steps of examining the memory storage area for stored acknowledgment packets and transmitting a single acknowledgment packet corresponding to the most recent, consecutive acknowledgment packet stored in the memory storage area.

6. A system for enhancing flow control of packet-based data transmissions between an upstream node and an end-point node, wherein all data packets pass through a common intermediate node, and an asymmetric communication link is defined between the intermediate node and the upstream node, and a high-speed symmetric communication link is defined between the intermediate node and the end-point node, the system comprising:

a first receiver configured to receive data packets transmitted from the upstream node to the intermediate node across the asymmetric communication link;

a first transmitter configured to transmit data packets received from the upstream node to the end-point node across the high-speed symmetric communication link;

a second receiver configured to receive acknowledgment packets from the end-point node across the high-speed symmetric communication link;

an acknowledgment selector configured to select a consecutive acknowledgment packet received from the end-point node; and a second transmitter configured to transmit the selected consecutive acknowledgment packet to the upstream node across the asymmetric communication link.

7. The system as defined in claim 6, wherein the acknowledgment selector is adapted to select the acknowledgment most recently received from the end-point node.

8. The system as defined in claim 6, further including a memory storage area disposed to store excess acknowledgment packets received from the endpoint node.

9. The system as defined in claim 8, wherein the acknowledgment selector is disposed to evaluate acknowledgment packets in the memory storage area and select for transmission the most recent, consecutive acknowledgment packet.

10. The system as defined in claim 9, wherein the acknowledgment selector operates by evaluating an acknowledgment number field of a Transmission Control Protocol header of the acknowledgment packets.

11. A system for enhancing flow control of packet-based data transmissions between an upstream node and an end-point node, wherein all data packets pass through a common intermediate node, and an asymmetric communication link is defined between the intermediate node and the upstream node, and a high-speed symmetric communication link is defined between the intermediate node and the end-point node, the system comprising:

first receiving means for receiving data packets transmitted from the upstream node to the intermediate node across the asymmetric communication link;

first transmitting means for transmitting data packets received from the upstream node to the end-point node across the high-speed symmetric communication link;

second receiving means for receiving acknowledgment packets from the end-point node across the high-speed symmetric communication link;

selector means for selecting a consecutive acknowledgment packet received from the end-point node; and second transmitting means for transmitting the selected consecutive acknowledgment packet to the upstream node across the asymmetric communication link.

12. The system as defined in claim 11, wherein the selector means is adapted to select the acknowledgment packet most recently received from the end-point node.

13. The system as defined in claim 11, further including a memory means for storing excess acknowledgment packets received from the endpoint node.

14. The system as defined in claim 13, wherein the acknowledgment selector is disposed to evaluate acknowledgment packets in the memory means and select for transmission the most recent, consecutive acknowledgment packet.

15. The system as defined in claim 14, wherein the acknowledgment selector operates by evaluating an acknowledgment number field of a Transmission Control Protocol header of the acknowledgment packets.

16. A computer readable storage medium residing at an intermediate node of a packet-based communication system wherein data is transmitted between an upstream node and an end-point node, the intermediate node having an asymmetric communication link on one side for communication with the upstream node and a high-speed symmetric link on the other side for communication with the end-point node, the computer readable storage medium containing program code for enhancing flow control for the transmission of data packets between the upstream node and the end-point node, the computer readable storage medium comprising:

- a first logic segment configured for receiving a plurality of data packets from the upstream node;
- a second logic segment configured for transmitting the received data packets to the end-point node and receiving acknowledgment packets from the end-point node for each data packet received by the end-point node; and
- a third logic segment configured for transmitting a single acknowledgment packet to the upstream node, the acknowledgment packet corresponding to the last, consecutive acknowledgment packet received from the end-point node.

17. In an intermediate node of a packet-based communication system wherein data is transmitted between an upstream node and an end-point node, the intermediate node having an asymmetric communication link on one side for communication with the upstream node and a high-speed symmetric link on the other side for communication with the end-point node, a method for enhancing flow control for the transmission of data packets between the upstream node and the end-point node comprising the steps of:

- receiving data packets transmitted from the upstream node to the intermediate node across the asymmetric communication link;
- transmitting data packets received from the upstream node to the end-point node across the high-speed symmetric communication link;
- receiving acknowledgment packets from the end-point node across the high-speed symmetric communication link;
- selecting a consecutive acknowledgment packet received from the end-point node; and
- transmitting the selected consecutive acknowledgment packet to the upstream node across the asymmetric communication link.

18. The method as defined in claim 17, wherein the step of selecting includes selecting the acknowledgment packet most recently received from the end-point node.

19. The method as defined in claim 17, wherein the step of selecting includes selecting the acknowledgment packet most recently, consecutively received from the end-point node.

* * * * *

UNITED STATES PATENT AND TRADEMARK OFFICE
CERTIFICATE OF CORRECTION

PATENT NO. : 6,091,710
DATED : July 18, 2000
INVENTOR(S) : Mawhinney

It is certified that error appears in the above-identified patent and that said Letters Patent is hereby corrected as shown below:

In the [54] Title, after the word "DATA", delete the phrase "SLOW DOWN", and substitute therefor --SLOW-DOWN--.

Column 1, line 2, after the word "DATA" delete the phrase "SLOW DOWN", and substitute therefor --SLOW-DOWN--.

Column 1, line 19, after the word "occurs", delete the word "do", and substitute therefor --due--.

Column 2, line 19, after the word "is", delete the word "piggy-backed", and substitute therefor --"piggybacked"--.

Column 4, line 42, after the first occurrence of the word "the", delete the word "endpoint", and substitute therefor --end-point--.

Column 4, line 53, after the word "drawings", add the symbol --,--.

Column 6, line 4, after the word "intermediate", delete the word "device", and substitute therefor --devices--.

Column 6, line 30, after the word "connections", delete the word "For", and substitute therefor --for--.

Column 11, line 5, after the word "then", delete the phrase "piggy-back", and substitute therefor --piggyback--.

Column 11, line 17, after the word "Specifically,", delete the word "and", and substitute therefor --an--.

Column 11, line 19, after the word "invention", delete the word "address", and substitute therefor --addresses--.

UNITED STATES PATENT AND TRADEMARK OFFICE
CERTIFICATE OF CORRECTION

PATENT NO. : 6,091,710
DATED : July 18, 2000
INVENTOR(S) : Mawhinney

It is certified that error appears in the above-identified patent and that said Letters Patent is hereby corrected as shown below:

Column 11, line 20, after the word "between", add the word --an--.

Column 11, lines 20 and 21, after the word "a", delete the phrase "high speed", and substitute therefor --high-speed--.

Column 12, line 1, after the word "purposes", delete the word "for", and substitute therefor --of--.

Column 12, line 31, after the second occurrence of the word "it", delete the word "receives" and substitute therefor --received--.

Column 12, line 51, after the word "operations", delete the word "which", and substitute therefor --that--.

Column 12, line 56, after the word "is", delete the word "characterize", and substitute therefor --characterized--.

Column 12, line 58, after the word "is", delete the word "implement", and substitute therefor --implemented--.

Claim 1, line 31, after the word "the", delete the word "lasts", and substitute therefor --last--.

UNITED STATES PATENT AND TRADEMARK OFFICE
CERTIFICATE OF CORRECTION

PATENT NO. : 6,091,710
DATED : July 18, 2000
INVENTOR(S) : Mawhinney

It is certified that error appears in the above-identified patent and that said Letters Patent is hereby corrected as shown below:

Claim 8, line 12, after the word "the", delete the word "endpoint", and substitute therefor --end-point--.

Claim 13, line 49, after the word "the", delete the word "endpoint", and substitute therefor --end-point--.

Signed and Sealed this

Seventeenth Day of April, 2001

Attest:

NICHOLAS P. GODICI

*Attesting Officer*      *Acting Director of the United States Patent and Trademark Office*